United States Patent [19]

Kessler

[11] Patent Number: 5,542,379
[45] Date of Patent: Aug. 6, 1996

[54] EMULSION FUEL FEEDING APPARATUS AND METHOD

[75] Inventor: Alfred Kessler, Duerrenaesch, Switzerland

[73] Assignee: HDC AG, Moenchaltorf, Switzerland

[21] Appl. No.: 211,871

[22] PCT Filed: Jan. 23, 1992

[86] PCT No.: PCT/EP92/00140

§ 371 Date: Dec. 1, 1994

§ 102(e) Date: Dec. 1, 1994

[87] PCT Pub. No.: WO93/10347

PCT Pub. Date: May 27, 1993

[30] Foreign Application Priority Data

Nov. 12, 1991 [DE] Germany .......................... 41 37 179.8

[51] Int. Cl.⁶ .................................................. F02B 47/02
[52] U.S. Cl. .................. 123/25 C; 123/25 E; 137/896
[58] Field of Search .................. 123/25 R, 25 C, 123/25 A, 25 E; 137/896; 366/155.1, 176.1

[56] References Cited

U.S. PATENT DOCUMENTS

| | | | |
|---|---|---|---|
| 4,831,971 | 5/1989 | Ott et al. | 123/25 A |
| 4,884,893 | 12/1989 | Zeiffer et al. | 366/176.1 |
| 4,938,606 | 7/1990 | Kunz | 123/25 R |
| 5,012,772 | 5/1991 | Nakamora | 123/25 C |
| 5,125,367 | 6/1992 | Ulrich et al. | 123/25 R |
| 5,192,130 | 3/1993 | Endo et al. | 366/155.1 |
| 5,230,253 | 7/1993 | Blough, Jr. et al. | 137/896 |
| 5,245,953 | 9/1993 | Shimada et al. | 123/25 C |

FOREIGN PATENT DOCUMENTS

| | | |
|---|---|---|
| 285190 | 10/1988 | European Pat. Off. . |
| 392545 | 10/1990 | European Pat. Off. . |
| 1416113 | 9/1965 | France ................................. 137/896 |
| 3237305 | 4/1984 | Germany . |
| 3523687 | 7/1986 | Germany . |
| 3504699 | 8/1986 | Germany . |
| 2109457 | 6/1983 | United Kingdom . |

OTHER PUBLICATIONS

The Use of Emulsified Fuels, the Motor Ship, No. 829, Aug. 1989, pp. 17–18.

Japanese Patent Abstract of Japan vol. 7, No. 55 M-198 (1200), Mar. 5, 1983.

*Primary Examiner*—Erick R. Solis
*Attorney, Agent, or Firm*—Beveridge, DeGrandi, Weilacher & Young, L.L.P.

[57] ABSTRACT

In order to prevent the increase of NOx due to an excessively high combustion temperature and the increase of HC and CO due to an excessively low combustion temperature, by feeding an emulsion of a fuel oil and water having a water content suitable for the combustion state in cylinders to a Diese engine, there is proposed: A combustion parameter sensor (3) for detecting combustion parameters inside cylinders such as an internal pressure of the cylinder, an engine knock, an exhaust gas, etc. and a water charging quantity judgement/regulation circuit (2) for setting a water charging quantity to a fuel are disposed in a Diesel engine (1). A water charging quantity controller (4) feeds water to an emulsion formation apparatus (5) in a quantity corresponding to a water charging signal from the water charging quantity judgement/regulation circuit (2). Accordingly, an emulsion fuel having a water content in accordance with the combustion state inside the cylinder is formed by, and fed from the emulsion formation apparatus (5) to the engine (1).

6 Claims, 8 Drawing Sheets

EMULSION FUEL FEEDING APPARATUS AND METHOD

This invention relates to a fuel feeding apparatus of an internal combustion engine. More in particular, it relates to an emulsion fuel feeding apparatus which feeds an emulsion of a fuel oil and water having properties suitable for the operating conditions of a Diesel engine to the engine. Further, the invention relates to a method to form a water-in fuel oil-emulsion.

PRIOR ART

It is generally known that NOx components in an exhaust gas can be reduced and an engine knock can be prevented by lowering the combustion temperature inside cylinders by feeding a fuel comprising an emulsion of a fuel oil and water to a Diesel engine.

Various methods and apparatuses have also been proposed as the apparatus for forming the emulsion of the fuel oil and water.

However, the conventional emulsion formation apparatuses have primarily been directed how to form an emulsion which is as homogeneous as possible and has a particle size as small as possible. Therefore, it has generally been difficult to readily and quickly change the water content of the emulsion.

For the reasons described above, the water content of the emulsion fuel has not been changed in practice in accordance with an engine load state in an emulsion fuel feeding apparatus using such an emulsion formation apparatus.

PROBLEMS THAT THE INVENTION IS TO SOLVE

When the engine is operated while the water content of the emulsion fuel is kept constant irrespective of the engine load, there occurs the problem that although the NOx components in the exhaust gas can effectively be reduced during a high speed high load operation, for example, the combustion temperature drastically drops and detrimental components such as HC and CO in the exhaust gas increase, on the contrary, during a low speed low load operation.

The emulsion formation apparatus used for the conventional emulsion fuel feeding apparatus for the Diesel engine has a complicated structure and its scaledown has been difficult.

MEANS FOR SOLVING THE PROBLEMS

According to the present invention, there is provided an emulsion fuel feeding apparatus for feeding an emulsion of a fuel oil and water to a Diesel engine, which comprises combustion parameter detection means for detecting at least one of combustion parameters associated with the combustion state of the engine; water content judgement/regulation means for determining the water content of the emulsion fuel in accordance with the output of the combustion parameter detection means; and emulsion formation means for forming an emulsion fuel having the water content determined by the water content judgement/regulation means.

Further, according to the invention, there is provided a method of forming an water-in-oil emulsion at a Diesel engine, by injecting water in a predeterminedly dosed quantity into Diesel oil, present between a fuel injection pump and a fuel injection nozzle of a cylinder of the Diesel engine in an inlet chamber; and introducing Diesel oil fed from the fuel injection pump under high pressure into the inlet chamber, while supplying the oil-water-mixture into the fuel injection nozzle.

EMBODIMENTS

Figure 1:
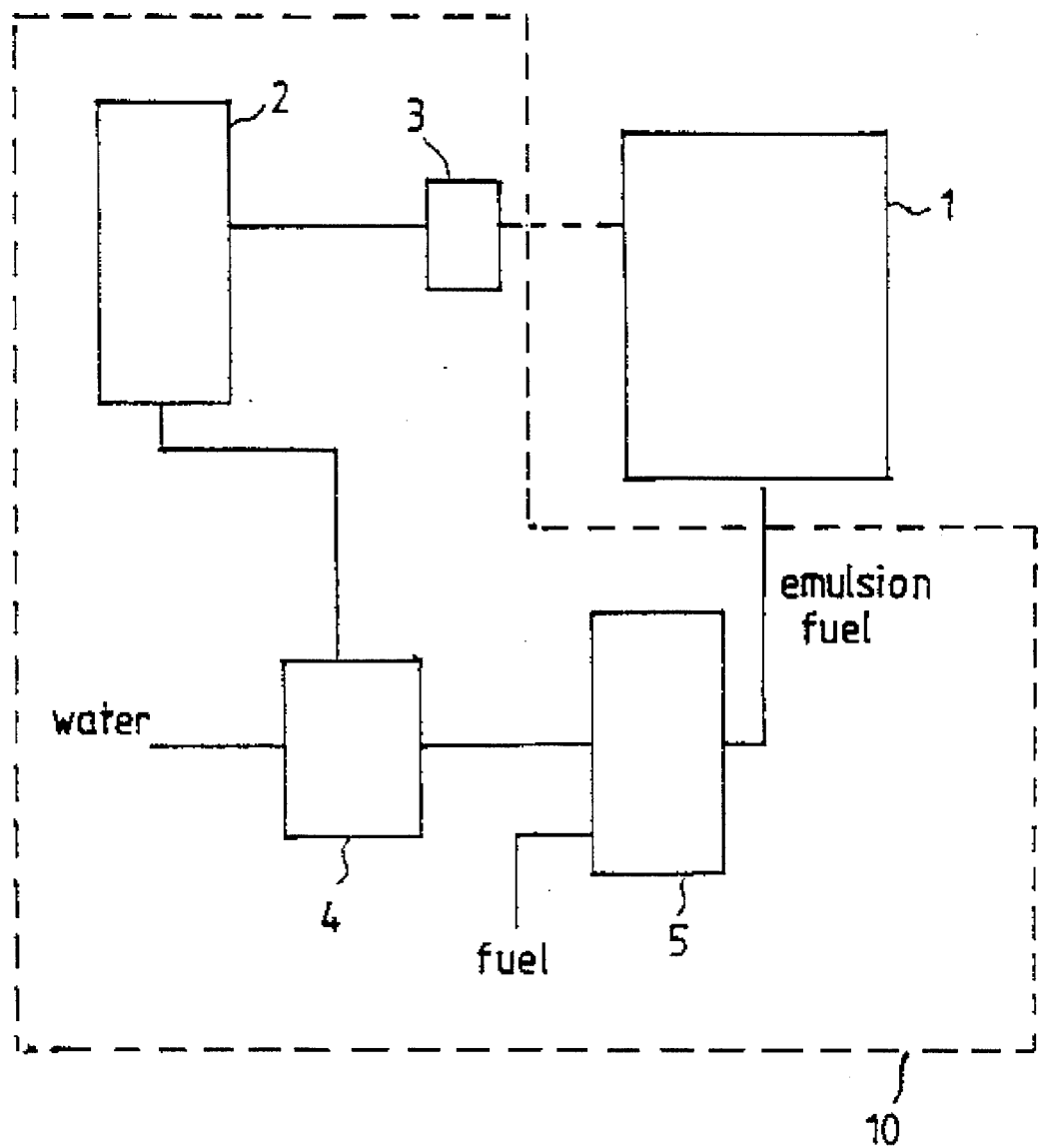
FIG. 1 is a block diagram showing the construction of an emulsion fuel feeding apparatus of the present invention.

FIG. 1 is a block diagram of an emulsion fuel feeding apparatus according to the present invention.

In FIG. 1, the emulsion fuel feeding apparatus is represented as a whole by reference numeral 10. Reference numeral 1 represents a Diesel engine, and 2 is a water feeding quantity judgement/regulation circuit. This embodiment uses a digital computer of a known type equipped with RAM, ROM, CPU, etc. as the regulation circuit. An output signal of a later appearing combustion parameter sensor 3 for detecting parameters associated with the combustion state of the engine is inputted to this water charging quantity judgement/regulation circuit 2. The output of the water charging quantity judgement/regulation circuit 2 is connected to a water charging quantity controller 4 for a water jet injection valve, etc., of an emulsion formation apparatus 5 so as to control the water content of the emulsion fuel.

The combustion parameter sensor 3 may be, e.g., a pressure sensor for detecting the combustion pressure inside the cylinder, a knock sensor for detecting an engine knock, a gas concentration sensor for detecting the concentrations of components in the exhaust gas such as NOx, HC, CO, etc., an exhaust gas temperature sensor for detecting the exhaust gas temperature, a torque sensor for detecting the engine output torque, a flowmeter metering the flow rate of fuel oil in a fuel oil line for detecting the engine performance, a supercharge pressure sensor for detecting the supercharge pressure of a turbosupercharger and a number-of-revolution sensor for detecting the number of revolution of the engine as will be described later, and two or more of these sensors are used in the combination or conjointly.

The water charging quantity judgement/regulation circuit 2 stores an emulsion water content set value in accordance with the output value of each combustion parameter used in a ROM or RAM in the form of a numeric value table, for example, determines the water content of the emulsion fuel in accordance with the combustion parameters, calculates the quantity of water to be added to the fuel (water charging quantity) for obtaining the determined water content, and feeds a predetermined quantity of water to a later-appearing emulsion formation apparatus.

Figure 2:
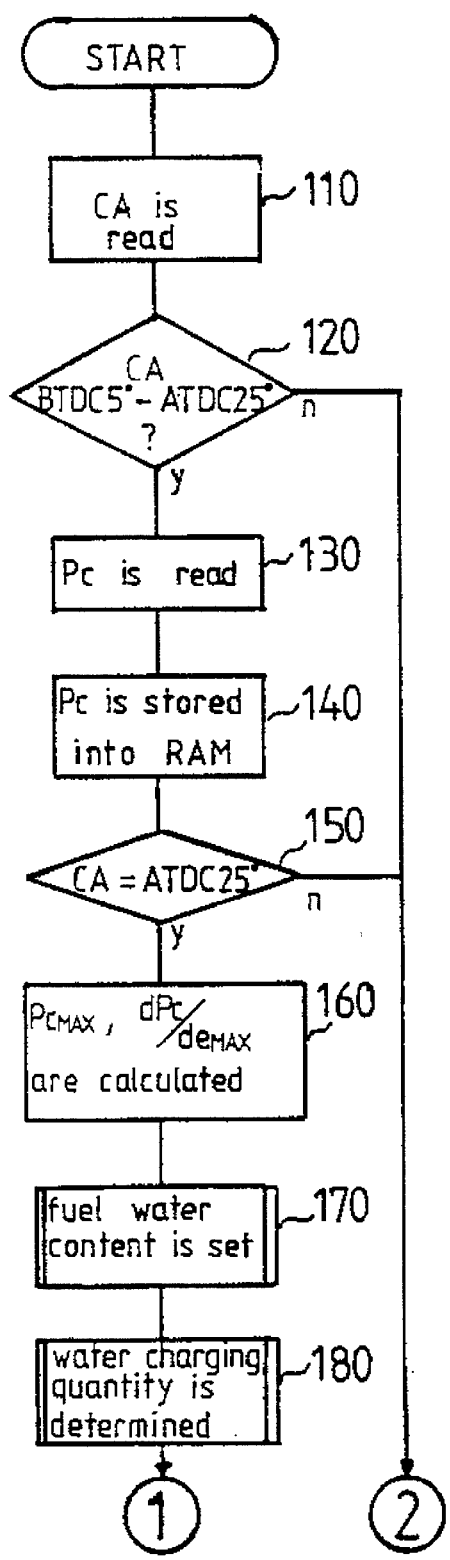
FIG. 2 is a flow-chart showing a first embodiment of the emulsion water content control.
Figure 3:
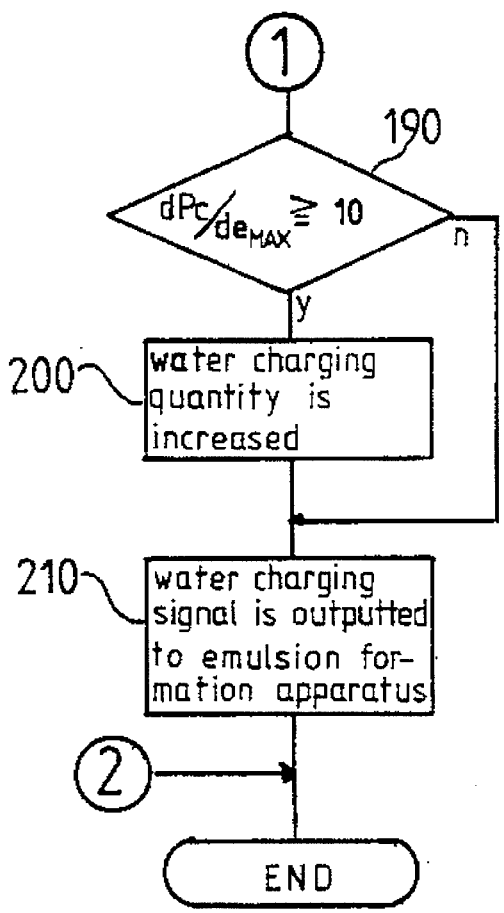
FIG. 3 is a flow-chart showing the first embodiment of the emulsion water content control.

FIGS. 2 and 3 are flowcharts of one embodiment of the control using a pressure sensor for detecting the combustion pressure inside the cylinders of the engine. This embodiment uses a piezoelectric sensor (a semiconductor strain gauge) as the pressure sensor and also uses a crank angle sensor for detecting the crank angle of the engine in order to improve response and accuracy of the control. This routine is executed per predetermined rotating angle (per degree of the rotating angle of the crank shaft, for example) by the water charging quantity judgement/regulation circuit 2.

When the routine of FIG. 2 is started, the crank shaft rotating angle CA is read from the crank angle sensor at Step 110, and whether or not the stroke of a specific cylinder (for example, the first cylinder) exists near the upper dead point of the compression stroke (within the range of 5° before the upper dead point (BTDC) to 25° after the upper dead point (ATDC) in this embodiment) is judged from this crank shaft rotating angle CA at Step 120. When the crank shaft rotating angle falls within the range described above, the routine proceeds to Step 130, where the internal pressure Pc of the cylinder is read from the pressure sensor, and the value is stored into a RAM of the water charging quantity judgement/regulation circuit 2 at step 140. In this way, the internal pressure of the cylinder near the upper dead point of the compression stroke is stored in the RAM of the water charging quantity judgement/regulation circuit 2 for each predetermined rotating angle of the crank shaft (per degree in this embodiment).

At the next Step 150, it is determined whether or not the crank shaft rotating angle reaches a predetermined value (ATDC 25° in this embodiment), and if it does, the maximum pressure Pc/deMAX and the maximum value dPc/deMAX of the increment ratio dPc/de of Pc with respect to the crank shaft rotating angle is calculated from the data set of the internal pressure Pc of the cylinder stored in the PAM (Step 160).

At the next Step 170, the fuel water content is set from the emulsion water content data stored in the ROM, for example of the water charging quantity judgement/regulation circuit 2 and from the maximum pressure PcMAX inside the cylinder. In this embodiment, the water content of the emulsion fuel is set in the following way.

| PcMAX (kg/cm$^2$) | water content (%) |
|---|---|
| Q ≦ PcMAX ≦ 40 | 0 |
| 40 < PcMAX ≦ 45 | 5 |
| 45 < PcMAX ≦ 50 | 10 |
| 50 < PCMAX ≦ 55 | 15 |
| 55 < PcMAX ≦ 60 | 20 |
| 60 < PcMAX | minimum 25 |

In other words, the water content of the fuel is increased in accordance with the pressure because the higher the maximum combustion pressure inside the cylinder, the higher becomes the concentration of the NOx components in the exhaust gas. In this embodiment, water is not added to the fuel when the maximum combustion pressure is below 40 kg/cm$^2$ in order to prevent the increase of the concentrations of the HC and CO components in the exhaust gas resulting from the drop of the combustion temperature. Similarly, the maximum water content or the emulsion fuel is set to at least 25% in this embodiment for the purpose of preventing the drop of the engine driving performance.

The water content set value described above is merely illustiative. In practice, therefore, the set value is preferably determined experimentally in accordance with the characteristics of the engine used.

After the water content (%) of the emulsion fuel is determined at Step 170 in FIG. 2 as described above, the quantity of addition of water (water charging quantity (l/min)) is determined at Step 180 from the fuel Supply quantity (l/min) to the engine and from the water content set value (%) described above.

Next, Steps 190 and 200 in FIG. 3 are executed in this embodiment so as to regulate the water charging quantity in accordance with the increment ratio maximum value dPc/deMAX of the internal pressure of the cylinder. In other words, it is determined at Step 190 whether or not the value dPc/deMAX calculated at Step 160 in FIG. 2 is above a predetermined value (e.g. 10 kg/cm$^2$.deg.) and when dPC/deMAX is above the predetermined value, the judgement is made to the effect that abnormal combustion takes place and the generation of NOx, too, is greater than in the normal case. Therefore, the water charging quantity calculated at Step 180 is increased at a predetermined ratio (by about 5% in this embodiment) at Step 200. When the operations described above are completed, the water charging signal is outputted to the later-appearing emulsion formation apparatus and a predetermined quantity of water is charged.

In this embodiment, the water content of the fuel to be fed to all the cylinders is set in accordance with the maximum value of the internal pressure of the specific cylinder. However, in the emulsion fuel feeding apparatus capable of individually setting the water content of the emulsion fuel for each cylinder, it is also possible to detect the maximum combustion pressure for each cylinder and to regulate the water content for each cylinder in accordance with the maximum combustion pressure.

This embodiment improves the control accuracy and response by correcting the water charging quantity in accordance with the increment ratio of the internal pressure of the cylinder, but this correction is not always necessary depending on the application and kind or the engine used.

Figure 4:
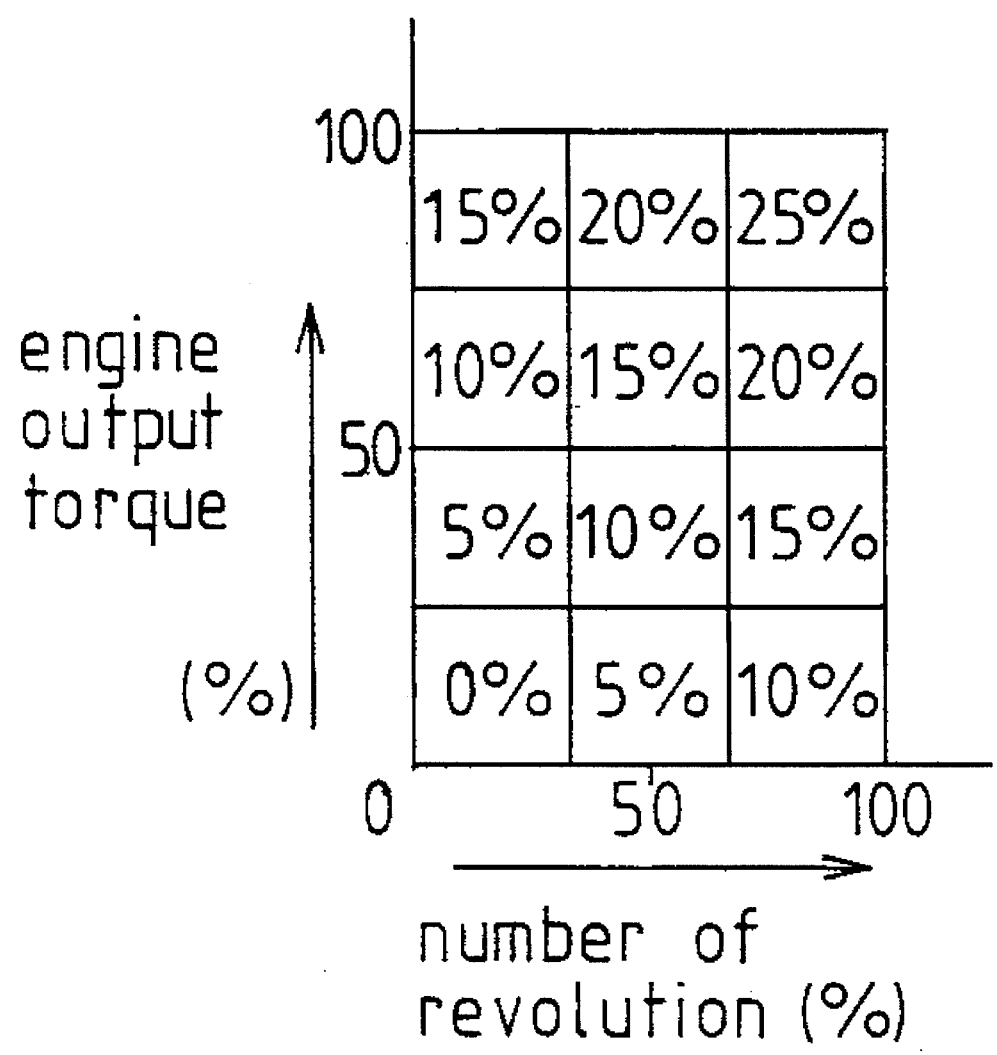
FIG. 4 is a diagram showing an example of set values of an emulsion water content ratio.

It is further possible to detect the output torque of the engine and its number of revolution and to determine the water content of the emulsion fuel in dependancy thereon in place of using the pressure sensor for detecting the internal pressure of the cylinder. FIG. 4 shows an example of the set value of the water content. In this case, the engine output torque may directly be determined by detecting the twist angle of the engine output shaft or may indirectly be determined from the opening of a throttle valve or from a fuel injection quantity.

Furthermore, the water control can be carried out by the use of a known knock sensor of a vibration detection type which is adapted to the engine cylinder block.

In this case, the water content set value of the emulsion fuel is updated with a predetermined interval (e.g. several seconds) during the engine operation. When the engine knock is detected during the predetermined period described above (e.g. vibration of 6 to 8 KHz), a new set value of the water content is obtained by increasing the present water content by a predetermined quantity (e.g. 5%), and the increase of the water content is not effected when no engine knock is detected. When the engine knock does not occur for a predetermined time (e.g. for about one minute), the operation is carried out so as to set the water content set value to a value lower by a predetermined value (e.g. 5%). Abnormal combustion in the engine can be prevented and the emission quantity of NOx can be reduced by detecting the engine knock and increasing the water content as described above. In this case, too, it is possible to employ the arrangement wherein a guard value (e.g. about 25% or more) is provided to the water content set value so that when the water content set value reaches this guard value, a further increase of the water content is stopped and at the same time, an alarm, etc., is raised to the operator.

When the fuel water content can be set individually for each cylinder, it is possible to detect the cylinder, in which the knock occurs, from the crank angle at which the knock occurs, and to increase the fuel water content, of only that cylinder, by the conjoint use of the crank angle sensor and the knock sensor.

Similar control can also be made by the use of a gas concentration sensor for detecting the concentration of only specific components such as NOx, CO, HC, etc., in the exhaust gas and a temperature sensor for detecting the engine exhaust temperature.

For example, the concentrations of the components in the exhaust gas such as NOx, HC, CO, etc., are detected by the use of a non-dispersive infrared analyzer as the gas concentration sensor. In this case, the concentration of the NOx component and the concentration of the HC or CO component in the exhaust gas are detected with a predetermined interval, and the water content set value is increased by a predetermined ratio (e.g. 5%) from the present value when the NOx concentration exceeds a predetermined value (e.g. 950 ppm). When the HC or CO component concentration exceeds a predetermined value, the water content set value is decreased by a predetermined ratio (e.g. 5%), on the contrary. When both of the NOx and HC or CO components are below predetermined concentrations, the water content set value is not changed. According to the stop-signal of the Diesel engine, the water content judgement/regulation circuit 2 sends a stop-signal of water injection to the water content regulation apparatus 4, and the Diesel engine runs only with Diesel fuel during the predetermined period (ex. 1 minute) by operating a timer (not shown). When such a control is carried out, it is possible to reduce the emission quantity of the NOx component and to prevent the increase in the emission quantity of the HC or CO component due to the excessive water charging quantity.

An example of the sensor for measuring only NOx is an exhaust NOx sensor of Tokuyama Soda K. K. which utilizes the principle of measurement of an oxide semiconductor system. When the fuel water content is regulated on the basis of the exhaust temperature by the use of a temperature sensor such as a thermocouple or an NTC type, thermistor in place of the gas eoncentration sensor, the engine exhaust temperature is detected for each predetermined time, and the water content set value is increased by a predetermined ratio (e.g. 5%) when the exhaust temperature enters an NOx increase zone (e.g. a high temperature range above about 390° C.), so as to lower the combustion temperature. When the exhaust temperature enters an HC/C0 increase range (a temperature range lower than about 340° C., for example), the water content set value is decreased by a predetermined ratio (e.g. 5%) so as to increase the combustion temperature, on the contrary. The water content set value is not changed outside the temperature ranges described above. According to the stop-signal of the Diesel engine, the water content judgement/regulation circuit 2 sends a stop-signal of water injection to the water content regulation apparatus 4, and the Diesel engine runs only with Diesel fuel during the predetermined period (ex. 1 minute) by operating a timer (not shown). In this way, the combustion temperature inside the cylinders is kept within a suitable range in which the generation of NOx and HC or CO components is less. In these cases, too, it is also possible to provide the aforementioned guard value to the water content set value and to raise an alarm when the upper limit of the water content set value is reached.

Next, an embodiment of the emulsion formation apparatus of the present invention will be explained with reference to FIGS. 5 to 8.

Figure 5:
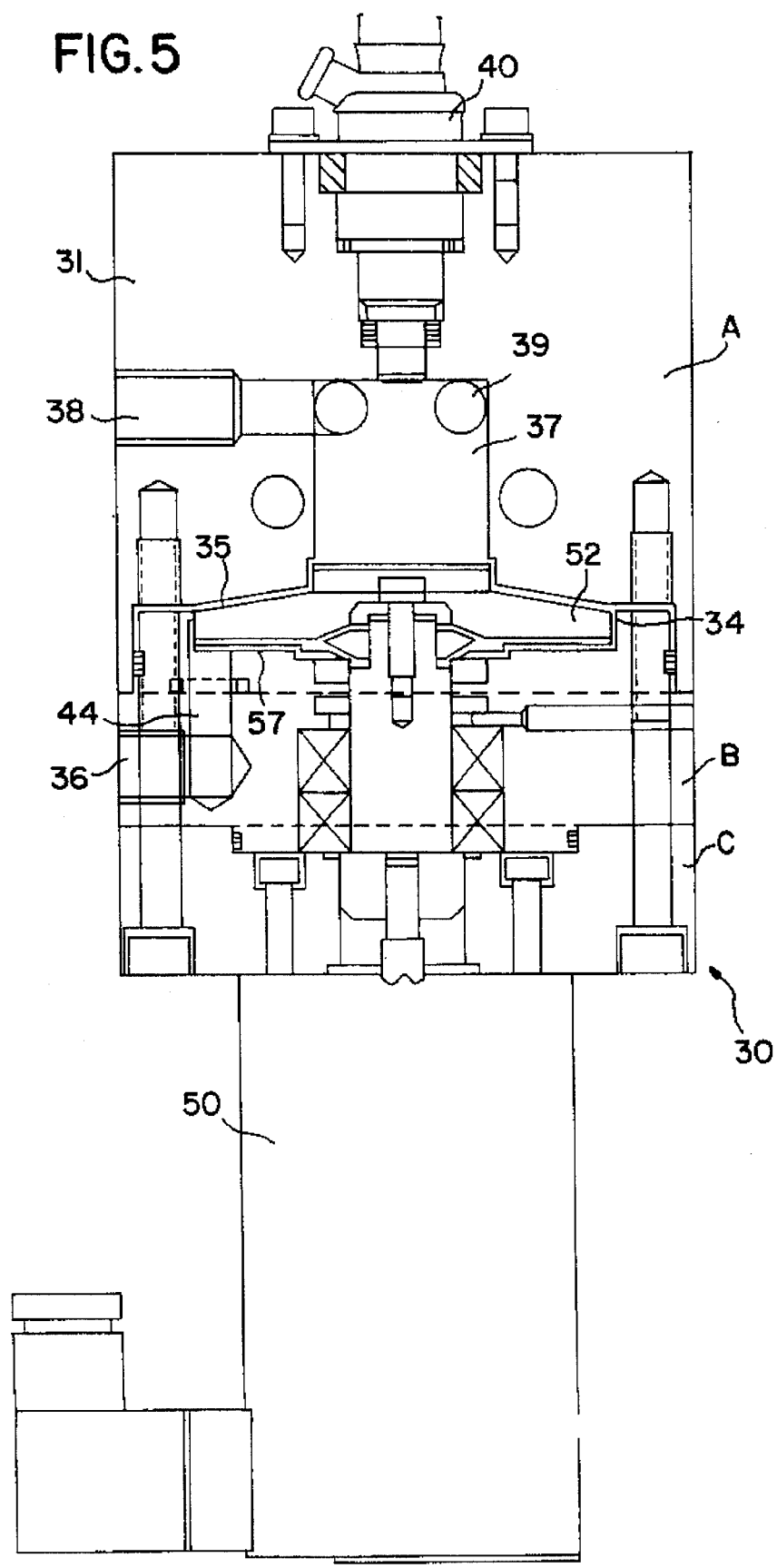
FIG. 5 is a sectional view showing an embodiment of an emulsion formation apparatus.

FIG. 5 is a longitudinal sectional view of the emulsion formation apparatus 30. As shown in FIG. 5, the emulsion formation apparatus of this embodiment is equipped with a cylindrical pump housing 31, and this pump housing 31 is divided in an axial direction into three units, that is, a suction portion A, a pump portion B and a motor portion C that are mutually coupled in the axial direction by bolts.

Figure 6:
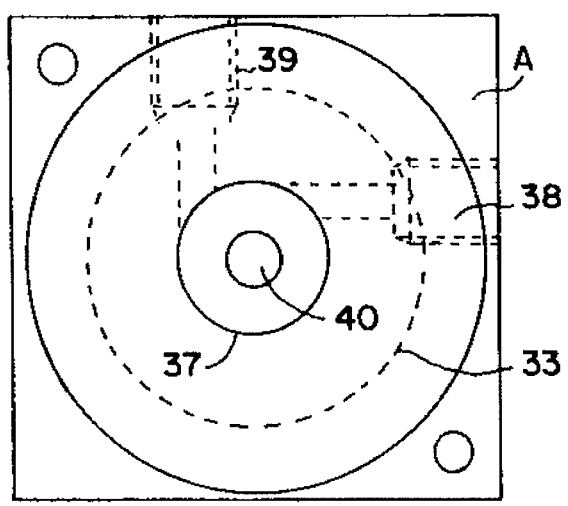
FIG. 6 is a bottom view of the portion A of FIG. 5.
Figure 7:
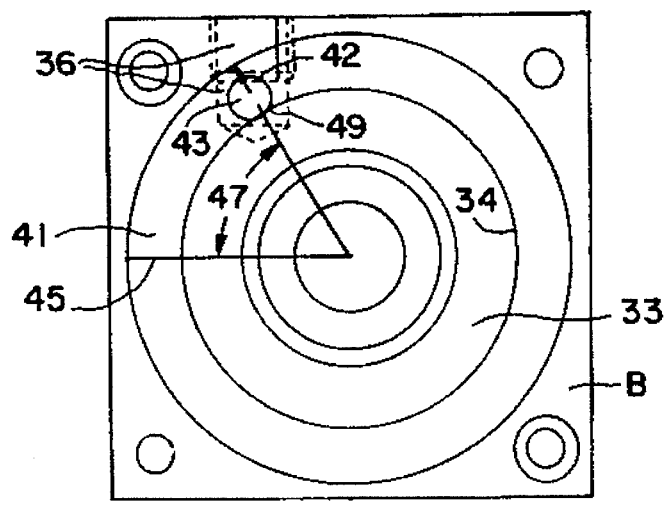
FIG. 7 is a plan view of the portion B of FIG. 5.
Figure 8:
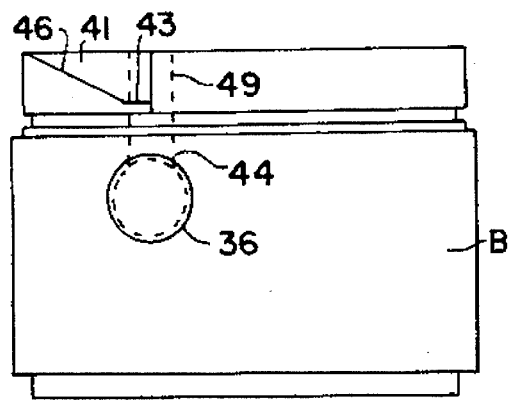
FIG. 8 is a side view of the portion B of FIG. 5.

FIG. 6 is a bottom view of the suction portion A of FIG. 5, FIG. 7 is a top view of the pump portion B of FIG. 5 and FIG. 8 is a side view of the pump portion B of FIG. 5. As shown in FIGS. 5 to 8, a cylindrical pump chamber 33 is defined inside the pump portion B, a radial impeller 35 is disposed inside the pump chamber 33 and an electric motor 50 fixed to the motor portion C drives the impeller 35 for rotation.

A cylindrical inlet chamber 37 of the emulsion formation apparatus 30 forming a suction chamber for the impeller 35 is defined coaxially with the radial impeller 35 inside the suction portion A as shown in FIG. 5.

As shown in FIGS. 5 and 6, an oil charging pipe 38 and a recycling charging pipe 39 are connected to the upper side surface of the inlet chamber 37 in a tangential direction with respect to the section of the inlet chamber 37. A fluid flowing into the inlet chamber 37 in the tangential direction from the oil charging pipe 38 and the recycling charging pipe 39 is allowed to generate a swirling flow inside the suction chamber, rotating in the same direction as the rotating direction or the radial impeller. A water jet valve 40 which is opened and closed electromagnetically is disposed at the upper part of the inlet chamber 37 on its axis.

A cylindrical wall surface 34 is formed in the pump chamber 33. This wall surface 34 is extended with a small clearance in the radial direction with respect to the outer periphery of the radial impeller 35 and its height in the axial direction is substantially equal to the thickness of the radial impeller 35 in the axial direction.

As shown in FIGS. 7 and 8, a notch 41 having a fanshaped section with respect to the center of the pump chamber 33 is formed on the wall surface 34. The center angle 47 of this notch 41 is within the range of 45° to 120° but preferably is about 60°.

An outflow port 43 to an emulsion outflow pipe 36 is so disposed as to open to the terminal end portion of the fanshaped notch 41 on its downstream side along the rotating direction of the impeller. The outflow port 43 is connected to the emulsion outflow pipe 36 through an outflow pipe 44 which is extended in parallel with the axis. The outflow pipe 44 is formed in the pump portion B of the housing 31 by drill machining, or the like. The diameter of the outflow pipe 44 is smaller than the width of the fanshaped notch 41 in its radial direction and this pipe 44 is disposed at the position as close as possible to the terminal end portion of the notch 41. To increase the sectional area of the outflow pipe 4, the outflow pipe 44 may have an elliptic sectional shape. The flat bottom surface 46 or the notch 41 is inclined towards the center of the pump chamber, and the height of the notch is equal to the thickness of the impeller 35 in the axial direction at the position of disposition of the outflow port 43 of the outflow pipe 44.

On the side of the outflow port 43 of the notch 41, on the other hand, the wall surface 34 defines a semicylindrical terminal end wall 42 in such a manner as to cover the half of the outflow port 43 along the open shape of the outflow port 43.

The emulsion flowing out from the impeller 35 impinges against this terminal end wall 42, changes its direction in the axial direction and flows into the outflow pipe 44 from the outflow port 43.

Though the terminal end wall 42 is shown formed in the semicylindrical shape so as to cover the half of the outflow port 43, it may consist of a cylindrical surface encompassing a quarter of the outflow port 43 and a flat surface extending in the radial direction while coming into contact with the former. In such a case, it is preferred that the outflow port 43 be formed as near as possible to the center of the pump chamber 33 so that the end portion or the cylindrical surface of the termial end wall 42 forms a knife edge 49. This knife edge 49 cuts off the emulsion flowing out from the radial impeller 35 from its outer periphery, and a substantially full quantity of the emulsion flows into the outflow port 43.

The radial impeller 35 has a disc shape as shown in FIG. 5 and a radial cover disc 57 is fitted to the impeller 35 on the side of the motor 50. A plurality of impeller blades 52 are fixed onto the cover disc 57.

When the apparatus of the present invention is used for a Diesel engine, the fuel pump discharge pipe of the engine is connected to the oil injection pipe 38, and high pressure water is fed from a water feed circuit to the water jet valve 40 through a high pressure pump. A feed pipe of the fuel injection pump of the engine is connected to the outlet of the emulsion outflow pipe 36 and the recycling fuel pipe from the fuel injection pump is connected to the recycling injection pipe 39.

The radial impeller 35 is preferably rotated at a constant speed of 3,000 r.p.m., for example, by the motor 50. The oil is injected by the fuel pump into the inlet chamber 37 in the tangential direction at a pressure of 1 to 3 bars, for example. Water is pressurized to 10 to 15 bars, for example, by a high pressure pump which is electrically or mechanically driven by the engine. This pressure is reduced to 5 to 7 bars by a pressure reducing valve, and is jetted into the inlet chamber 37 while being intermittently controlled by the jet valve 40 which is electromagnetically operated. The emulsion flowing out from the radial impeller 35 flows into the notch 41, is then intercepted by the terminal end wall 42 and flows into the outflow pipe 44 of the emulsion outflow pipe 36 in the axial direction. At this time, the emulsion is cut off from the emulsion portion inside the radial impeller 35 by the sharp edge 49. The excessive fuel recycling from the fuel injection pump is returned into the inlet chamber 37 through the recycling injection pipe 39, where it is mixed again with the new oil and water injected afresh. The feed of the new oil and water is carried out while being controlled so that the overall recycling circuit is always filled as completely as possible without any bubbles in accordance with recycling.

The water jet valve 40 can control the water charging quantity into the inlet chamber 37 as its opening/closing interval is changed. As described already, the water charging quantity judgement/regulation circuit 2 sets the water content of the emulsion in accordance with the combustion state in the cylinder, calculates the required water charging quantity from the quantity of the fuel oil fed from the fuel pump into the emulsion formation apparatus and from the set water content, and charges a required quantity of water by controlling the opening/closing interval of the water jet valve 40.

Though the emulsion formation apparatus in this embodiment includes the radial impeller 3, it is also possible to employ the system wherein the outlet of the inlet chamber 37 is directly connected to the emulsion outflow pipe 36 without disposing the radial impeller. In this case, the shape of the inlet chamber 37 is not cylindrical but preferably a so-called "pear" shape whose diameter progressively increases from the upper part to the lower part, reaches the maximum diameter portion and then decreases progressively until it connects to the outflow pipe 36.

The experiments carried out by the present Applicant reveal that an extremely fine and homogeneous water particle emulsion can be formed when the pressure difference between the pressure of water fed to the water jet valve 40 and the pressure of the oil supplied to the inlet chamber 37 (water pressure—oil pressure) is at least 0.5 bars irrespective of the existence of the radial impeller if an ordinary nozzle diameter (about 0.5 mm) is used for the water jet valve 40, and the corrosion property can be drastically reduced in comparison with an ordinary oil-water emulsion.

The following illustrates an example of the test results of the corrosion test of the emulsion of the Diesel oil and water formed by the emulsion formation apparatus described above under various conditions.

1. Corrosion test

Each of the samples A to J illustrated below was placed into a container having a diameter of 10 mm, a height of 35 mm and an inner capacity of 5 ml, and a needle for a fuel injection valve was dipped into the emulsion. Since the emulsion was separated into an upper layer in which the Diesel oil was predominant and a lower layer in which water was predominant, when the emulsion was left standing, the needle was so dipped, as to come into contact with both of these layers.

2. Samples

A: service water alone

B. Diesel oil alone

C. emulsion (water content=15%); so prepared by the apparatus shown in FIG. 5 as to provide an oil—water pressure difference of 0.5 bars)

D: emulsion (prepared in the same way as above, but with the oil—water pressure difference of 1.5 bars)

E: emulsion ( prepared in the same way as above, but with the oil—water pressure difference of 3 bars)

F: emulsion (prepared in the same way as above, but with the oil—water pressure difference of 10 bars)

G. emulsion (water content=15%, prepared by the apparatus of FIG. 5 having the pear-shaped inlet chamber 37 with the oil water pressure difference of 3 bars)

H. emulsion (water content=15% prepared by the apparatus not including the radial impeller but having the pear-shaped suction chamber and with the oil water pressure difference of 3 bars)

I. emulsion (water content=15% prepared by the apparatus not including the radial impeller but having the cylindrical suction chamber and with the oil water pressure difference of 3 bars)

J. emulsion (water content=15%; prepared by the apparatus of FIG. 5 with the oil—water pressure difference of 0.2 bars)

3. test results

| Sample | Observation Results |
|---|---|
| A | Discoloration (black) occurred one day later. |
| B | Discoloration (black) occurred 120 days later. |
| C | Discoloration (black) occurred at the contact portion with the lower layer 35 days later. |
| D | Discoloration (black) occurred at the contact portion with the lower layer 90 days later. |
| E | Discoloration (black) occurred at the contact portion with the lower layer 120 days later. |
| F | Discoloration (black) occurred at the contact portion with the lower layer 120 days later. |
| G | Discoloration (black) occurred at the contact portion with the lower layer 140 days later. |
| H | Discoloration (black) occurred at the contact portion with the lower layer 50 days later. |
| I | Discoloration (black) occurred at the contact portion with the lower layer 45 days later. |
| J | Discoloration (black) occurred at the contact portion with the lower layer 7 days later. |

As described above, the emulsions so prepared as to have the oil water pressure difference of at least 0.5 bars exhibited good results in the corrosion test.

So long as the oil water pressure difference was 0.5 bars, good results could likewise be obtained within the range of the nozzle diameter of 0.1 mm to 2 mm diameter by similar experiments irrespective of the spray pattern resulting from the nozzle structure, the nozzle diameter and the flow velocity.

Next, another embodiment of the emulsion fuel feeding apparatus of the present invention will be explained with reference to FIGS. 9 to 12.

Figure 9:
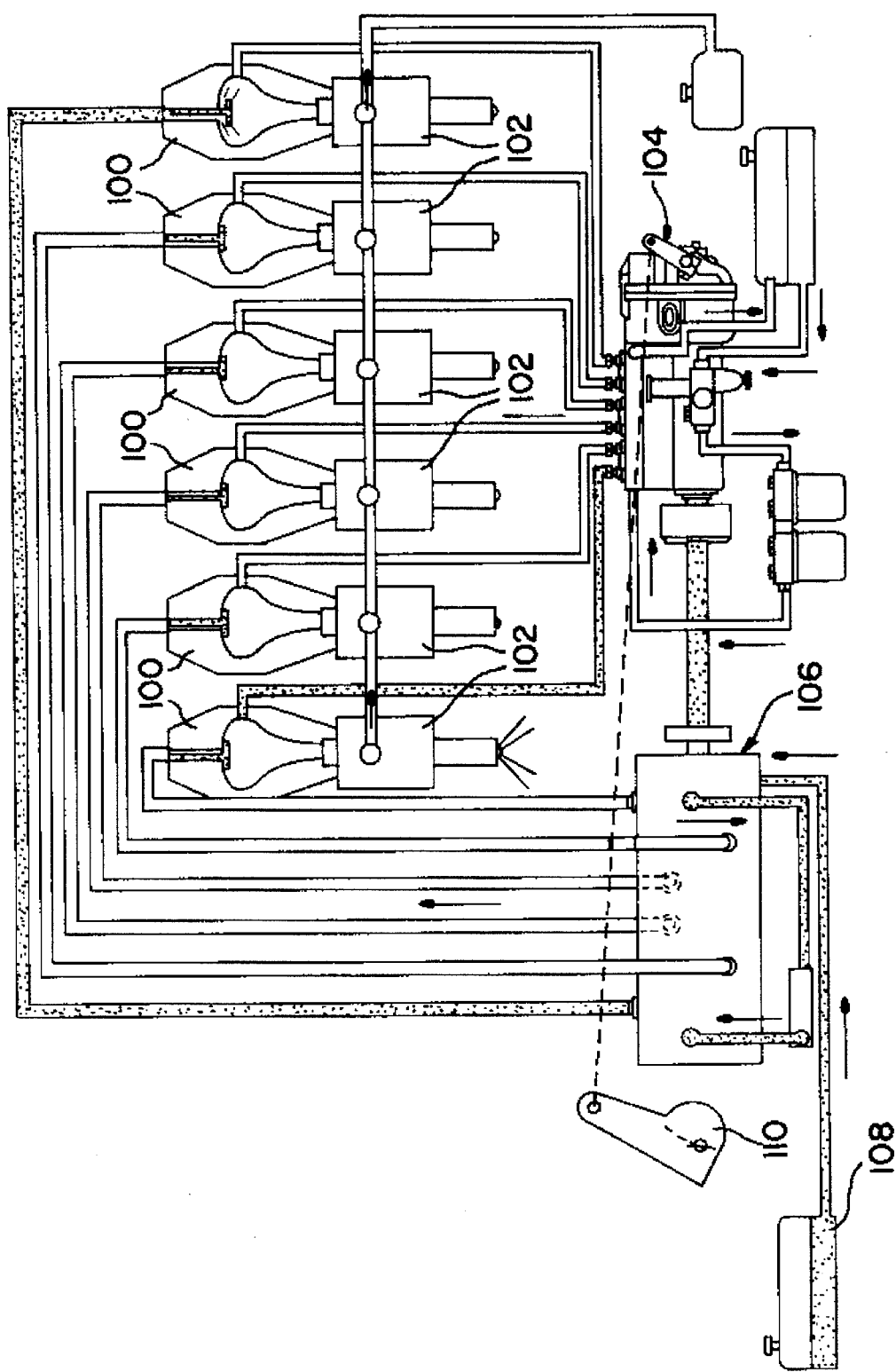
FIG. 9 is a schematic view showing an embodiment of an emulsion fuel feeding apparatus.

FIG. 9 is a schematic view of the emulsion feeding apparatus as a whole. In the foregoing embodiment, the emulsion formation apparatus is interposed between the fuel pump and the fuel injection pump, and one set of the emulsion formation apparatus feeds the fuel to all the cylinders. In this embodiment, however, a plurality of emulsion formation apparatuses 100 are interposed between the fuel injection pump and each of the fuel injection nozzles of the cylinders, each emulsion formation apparatus 100 being fitted individually to the fuel injection nozzle 102 of the respective cylinder.

In FIG. 9, reference numeral 10 represents the fuel injection pump and reference numeral 106 represents a metering unit for jetting water which will be later described. The emulsion formation apparatus 100 of this embodiment can be connected to the fuel inlet portion of the fuel injection nozzle 102 without modifying the ordinary fuel injection nozzle 102. As can be understood from FIG. 9, the emulsion formation apparatus 100 has the function of mixing the high pressure fuel supplied from the fuel injection pump 104 to the fuel injection nozzle 102 with high pressure water supplied from the metering unit 106, forming the emulsion of the fuel oil and water, and jetting it into the cylinder from the respective injection nozzle.

Figure 10:
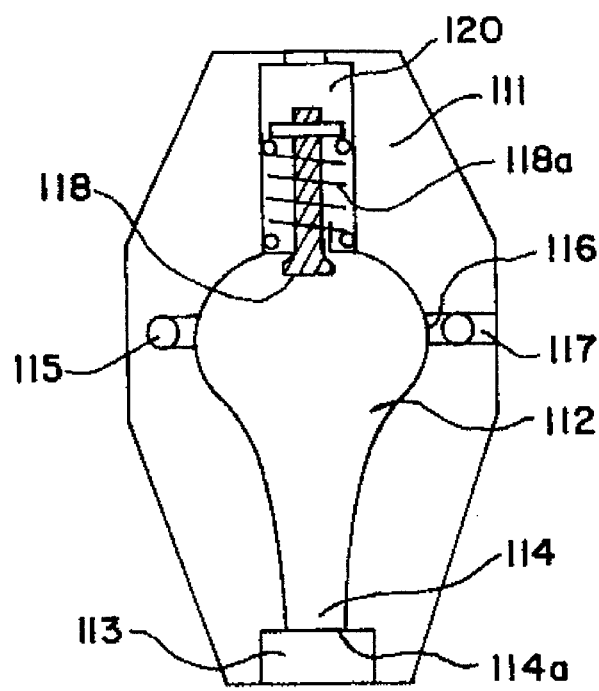
FIG. 10 is a sectional view of the emulsion formation apparatus shown in FIG. 9.

FIG. 10 is a longitudinal sectional view of the emulsion formation apparatus 100. The emulsion formation apparatus 100 includes a pressure-resistant housing 111 capable of withstanding the jetting pressure of the fuel, and an inlet chamber such as a swirl chamber 112 and corresponding to the inlet chamber 37 of the foregoing embodiment is defined inside the housing 111. The swirl chamber 112 has the shape of rotation symmetry and is shaped into a so-called "pear" shape having a tapered nozzle shape the diameter of which decreases progressively from the upper portion through an increased diameter portion in this embodiment. A lower nozzle outlet 114 of the swirl chamber 112 opens via a sharp edge 114a into a threaded bore 113 of a diameter substantially exceeding that of nozzle outlet 114. The fuel inlet of the fuel injection nozzle 102 is rigidly screwed into the threaded bore, so that the emulsion fuel leaving the swirl chamber 112 is supplied into the injection nozzle 102. The swirl chamber 112 is surrounded near the increased diameter portion thereof by a ring channel 115. A passage 117 formed inside the housing 111 and connected to the fuel injection pump 104 is opening into ring channel 115 in tangential direction thereof. Three ports 116 evenly distributed around the circumference of swirl chamber 112 are open to the wall surface of the swirl chamber 112 in the tangential direction near the increased diameter portion of the swirl chamber 112. In a modified embodiment (not shown) the ring channel 115 may be omitted. In such an embodiment channel 117 would opening directly into the swirl chamber 112 approximately in tangential direction of the wall surface of the swirl chamber 112 via a sharp edge.

A nonreturn valve formed as a poppet valve 118 is normally biased in the valve closing direction by a spring 118a. The water injection port 120 is connected to the metering unit 106 through the water piping. When the pressure of water supplied from the metering unit 106 to the injection port 120 exceeds a predetermined value (e.g. 30 bars), the poppet valve 118 is pushed by the water pressure and opens the valve against the force of the spring 118a, so that water is jetted from the water injection port 120 into the swirl chamber 112. The poppet valve 118 has the valve body head shape such that water can be sprayed uniformly in an umbrella shape inside the swirl chamber 112.

In this embodiment, the water injection into the swirl chamber 112 is effected at an intermediate point between two successive high pressure fuel supply intervals and fuel injection intervals of the associated fuel injection nozzle 102 into the cylinder (at a point after 360° in terms of the crank angle after completion of the fuel injection in a four-cycle engine, for example) and at such a point at which the fuel pressure inside the swirl chamber 112 is dropped to e.g. 3 to 10 bar and the fuel injection nozzle 102 ist closed. The water is injected in a dosed quantity into swirl chamber 112 under a pressure of e.g. 35 bars. The pressure increase effected by the water injection into the swirl chamber 112 is too low to open the injection nozzle 112. Fuel displaced by the injected water is returned through the fuel supply line to the injection pump 104 through a relief valve thereof (not shown, but orderly present at the injection pump for pressure relief in the oil supply lines at the end of the injection intervals) and is collected in a special container (not shown). The amount of injected water being at least three times smaller than the amount of fuel present in the supply line and in the swirl chamber, no water can reach the injection pump.

When the fuel injection timing is reached after water is injected into the swirl chamber 112, high pressure fuel is supplied from the fuel injection pump 104 into the swirl chamber 112 and flows into the fuel injection nozzle 102 from the nozzle outlet 114 below the swirl chamber 112. Since this fuel is injected into the swirl chamber 112 from the tangential direction, the content of the swirl chamber 112 is caused during the high pressure fuel supply interval to rotate with high speed. The injection nozzle opens under the high fuel pressure and a strong vortex flow is created inside the swirl chamber 112 during the injection period of the injection nozzle when the emulsion flows out of the swirl chamber 112 into the open injection nozzle of fuel injection nozzle 102. During flowing out of the swirling emulsion the pressure in the flow decreases in the tapering portion of the swirl chamber 112. The pressure in the flow is than increasing again after the flow has passed the sharp shearing edge 114a due to the sudden enlargement of the flow cross-section in bore 113 at the entry into the injection nozzle. Due to these events, fine particulation of the water particles atomized in advance into the swirl chamber 112 and their uniform mixing with the fuel are effected. Accordingly, an uniform emulsion of the fuel oil and water is supplied from the nozzle outlet 104 into the fuel injection nozzle 102 and is injected into the respective cylinder from the nozzle of the fuel injection nozzle 102.

Further, since the water injection nozzle 118 is designed as a poppet valve having an enlarged valve disk, the valve 118 is sealed under the effect of the high fuel injection pressure, so that the return spring of the valve can be designed for a small spring force.

As resulting from the foregoing description of the operation of the emulsion formation apparatus 100, the content of the swirl chamber is driven for rotation by the tangentially entering pressure oil only during the high pressure oil supply intervals, controlled by the fuel injection pump, and rotates idle in the time interval between two successive high pressure oil supply intervals under a substantial reduced middle pressure. The water is injected in each of these time intervals of reduced pressure, so that the water supply intervals and the oil supply intervals alternate with eachother. The water-in-oil emulsion is prepared by the injection of water into the swirl chamber and is finished in a vortex out flow created during the displacement into the injection nozzle by the high pressure oil supplied by the fuel injection pump. Further, other than in the embodiment of FIG. 5, no recirculation of the formed emulsion into the swirl chamber is required, enabling in principle to individually adjust the water content of the fuel injected into the cylinder in each of the injection periods.

Next, the metering unit 106 (see FIG. 9) for supplying high pressure water to the emulsion formation apparatus of each cylinder will be explained. As described above, the metering unit 106 receives the water charging quantity signal in accordance with the engine combustion state from the water charging judgement/regulation circuit 2 and supplies a predetermined quantity of water to the emulsion formation apparatus 100 of each cylinder at a predetermined timing.

In this embodiment, the metering unit 106 incorporates therein a high pressure water pump (not shown in the drawings) which is driven by the engine output shaft, sucks water from the water tank 108 and supplies it to each emulsion formation apparatus at a pressure of e.g. approximately 35 bars. The built-in high pressure water pump preferably has a capacity sufficiently greater than the maximum value of the water injection quantity (about three times the maximum charging quantity, for example), and excessive water is preferably returned into the water tank 108 from the high pressure water pump outlet through a recycling piping (not shown in the drawings).

Figure 11:
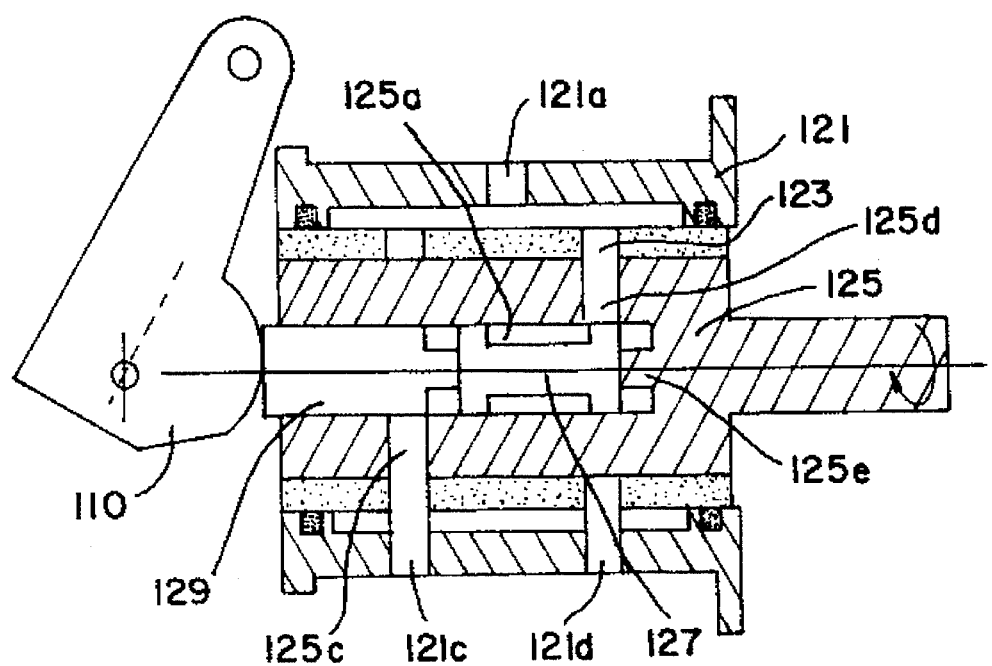
FIG. 11 is a schematic sectional view of the metering unit shown in FIG. 9.
Figure 12:
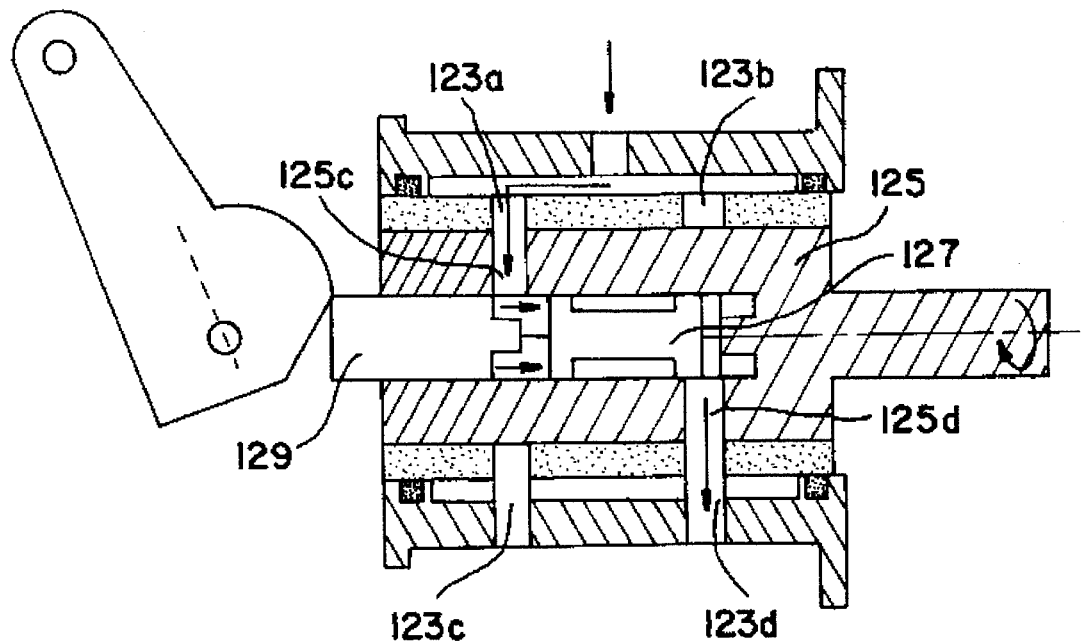
FIG. 12 is an explanatory wiew useful for explaining the operation of the metering unit shown in FIG. 9.
Figure 13:
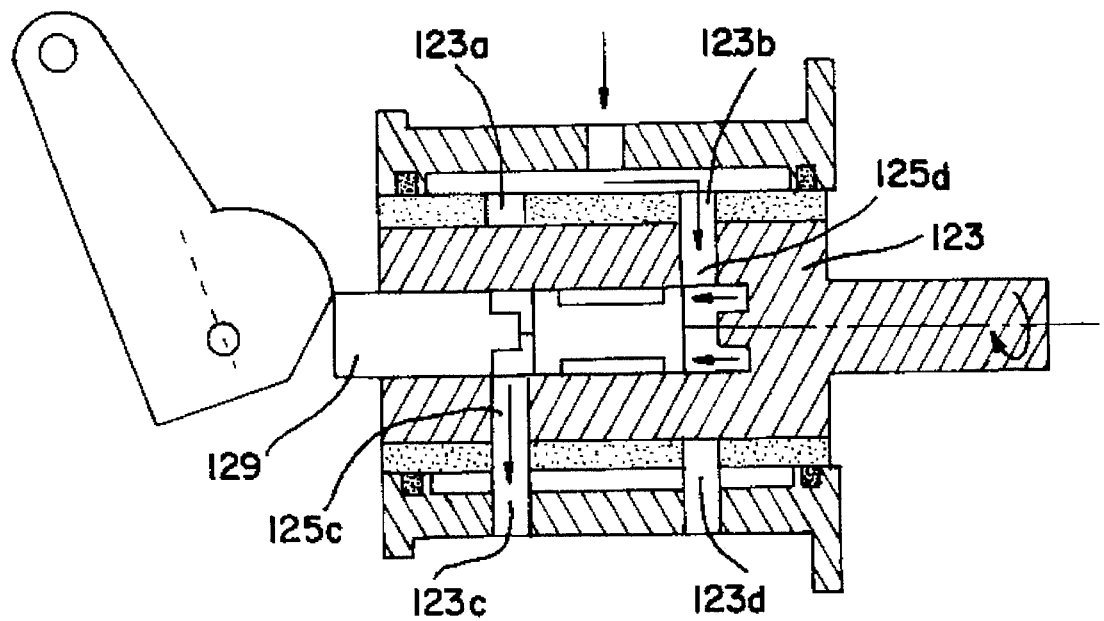
FIG. 13 is an explanatory view useful for explaining the operation of the metering unit snown in FIG 9.

FIGS. 11 to 13 are schematic views showing the structure and operation principle of the metering unit 106.

As shown in FIG. 11, the metering unit 106 includes a cylindrical outer housing 121, a sleeve (inner housing) 123 pressed into and fixed to this outer housing 121 and a rotor 125 rotating inside the sleeve 123. In the outer housing 121 are disposed a water inlet port 121a from the high pressure water pump and water discharge ports 121c, 121d (the port positions for the 2-cylinder engine being shown in FIGS. 11 to 13) for the emulsion formation apparatus 100 for each cylinder. The sleeve 123 is provided with water inlet ports 123a, 123b communicating with water feed passage 121d defined between the sleeve 123 and the outer housing and with discharge ports 123c, 123d communicating with discharge ports 121c, 121d of the outer housing 127. The rotor 125 is provided with a bore 125a at its center and ports 125c, 125d communicating with this bore 125a in the radial direction. The port 125c alternately communicates with the ports 123a, 123c of the sleeve when the rotor 125 rotates while the port 125d communicates alternately with the ports 123b, 123d of the sleeve when the rotor 125 rotates.

The ports 123a, 123c, the ports 123b, 123d and the ports 125c, 125d of the rotor are disposed at positions which are mutually symmetric at 180°.

The rotor 125 is synchronously driven at a speed of ½ of the crank shaft by the engine crank shaft through a toothed belt, or the like.

A piston 127 and a movable stopper 129 are slidably disposed inside the bore 125a of the rotor 125, and the position of the movable stopper 129 in the axial direction can be adjusted from outside by rotating a cam 110. A stationary stopper 125e is formed at the end portion inside the bore 125a opposite to the movable stopper 129.

In this embodiment, when the rotor 125 is rotated, the port 125c of the rotor 125 alternately communicates with the ports 123a, 123c of the ports and the port 125d of the rotor alternately communicates with the ports 123b, 123d of the sleeve, so that the piston 127 reciprocates inside the bore 125a and alternately discharges high pressure water from the discharge ports 123c (121c) and 123d (121d).

Hereinafter, this function will be explained with reference to FIGS. 12 and 13.

First of all, when the rotor 125 rotates and the port 125c communicates with the port 123a of the sleeve as shown in FIG. 12, water from the high pressure pump flows from the port 123a into bore 125a at the left side of the piston 127 in the drawing. Therefore, the piston 127 is pushed to the right in the drawing. Under this state, the port 125d existing on the right side of the piston 127 communicates with the discharge port 123d of the sleeve 123. Accordingly, when the piston 127 moves to the right, water inside the bore 125a on the right side of the piston 127 is pushed by the piston 117 from the port 123d and flows out. Water that flows out from the port 123d is supplied to one of the emulsion formation apparatuses and the feed pressure of this water is substantially equal to the discharge pressure (approx. 35 bars) of the pressure of water acting on the left side of the piston 127, that is, the discharge pressure (approx. 35 bars) of the high pressure water pump. Discharge of water from the port 123d stops when the piston 127 moves to the right and strikes the stationary stopper 125e of the rotor 125. Next, when the rotor 125 further rotates and comes to the position shown in FIG. 13, the port 125d communicates with the inlet port 123b of the sleeve 123 and the port 125c communicates with the discharge port 123c. Accordingly, high pressure water flows to the right side of the piston 127 from the port 123b in the opposite way to FIG. 12 and pushes the piston 127 to the left. In consequence, water inside the bore 125a on the left side of the piston 117 is discharged from the port 123c into another emulsion formation apparatus. In this case, too, discharge of water from the port 123c stops when the piston 127 strikes the movable stopper 129. In this way, the piston 127 reciprocates between the stationary stopper 125e and the movable stopper 129 and feeds water in a quantity corresponding to its stroke into the emulsion formation apparatus of each cylinder.

As described above, the quantity of water (water charging quantity) supplied to each emulsion formation apparatus is determined by the stroke of reciprocation of the piston 127 of the metering unit 106, that is, the gap between the stationary stopper 125e and the movable stopper 129. In this embodiment, the position of the movable stopper 129 can be adjusted from outside by rotating the cam 110. Therefore, if a suitable actuator such as a stepper motor is disposed and the cam 110 is rotated to the water charging quantity set by the water charging quantity judgement/regulation circuit 2, it becomes possible to regulate the water quantity to be fed to the emulsion formation apparatus of each cylinder and to adjust the water content of the emulsion fuel in accordance with the combustion condition of the engine.

By the way, FIGS. 12 and 13 show the cam position when the stroke is maximal (the maximum water charging quantity) and FIG. 11 shows the cam position when the stroke is zero (the stop of water charging).

Though FIGS. 11 through 13 explain the metering unit for the two-cylinder engine, this metering unit can easily be adapted to 4-, 6-, 8- and 12-cylinder engines by changing the numbers of the ports of the rotor 125 and sleeve 113. In the case of the six-cylinder engine, for example, six ports are disposed at angles of 60° to the axis of rotation of the rotor.

On the other hand, though an adjustment of the cam position of the metering unit by an electronically controlled stepper motor or other suitable actuater is preferred, it is also possible to control the cam position mechanically in accordance with the adjustment of the fuel injection pump 104 by coupling the cam to the adjusting rod of the fuel injection pump, as shown by the dashed line in FIG. 9.

In the embodiments above, the water charging timing to the emulsion formation apparatus of each cylinder is adjusted to a predetermined crank angle by synchronously driving the rotor 125 from the crank shaft by the use of this metering unit. However, when the water content of the emulsion fuel is individually changed in accordance with the combustion state of each cylinder, water from the high pressure pump is individually fed to each emulsion formation apparatus (the swirl chamber 112 shown in FIG. 10) through a solenoid valve disposed for eaeh cylinder without using the metering unit. For example, it is possible to individually change the water content of the emulsion fuel to be fed to each cylinder by detecting the combustion pressure of each cylinder by the pressure sensor to determine the water charging quantity as already described, sensing the water charging quantity signal to the solenoid controller, and regulating the opening/closing time controlled by this solenoid controller.

EFFECTS OF THE INVENTION

According to the emulsion fuel feeding apparatus of the present invention, an emulsion fuel having a suitable water content in accordance with the combustion condition of the engine can be fed to each cylinder. Therefore, the combustion temperature inside each cylinder can always be kept within a suitable range and emission quantities of NOx, HC, CO, etc, in the exhaust gas can effectively be reduced.

I claim:

1. An oil-water emulsion formation apparatus comprising:

a rotationally symmetric inlet chamber;

an oil inlet passage opening into said inlet chamber in a tangential direction;

a water jet nozzle disposed at one of the ends of said inlet chamber in an axial direction, subjected to electric opening/closing control, for jetting water into said inlet chamber;

a pump chamber formed at the other end of said inlet chamber in the axial direction;

a pump impeller having a radial shape, fitted coaxially with the axis of said inlet chamber inside said pump chamber and being surrounded by a cylindrical wall surface of said pump chamber along the outer periphery of said pump impeller, said pump impeller being driven for rotation by a driving source;

a notch portion formed in said wall surface of the said pump chamber;

an emulsion outlet opening in a direction parallel to the axis of rotation of said pump impeller in the proximity of the end portion of said notch portion at the downstream side in the rotating direction of said pump impeller; and a terminal wall for intercepting the emulsion flow flowing inside said notch portion in the rotating direction of said pump impeller.

2. An oil-water emulsion formation apparatus comprising:

a rotationally symmetric swirl chamber disposed at an inlet portion of a fuel injection nozzle of each of the cylinders of a Diesel engine;

an oil inlet passage being connected to an oil outlet of a fuel injection pump of the Diesel engine opening into said swirl chamber in a tangential direction;

a water jet nozzle disposed at one of the ends of said swirl chamber in an axial direction, and opening into an inlet chamber; and an emulsion outlet passage formed at the other end of said swirl chamber in the axial direction, and connecting said inlet chamber to said fuel injection nozzle inlet.

3. An oil-water emulsion formation apparatus according to claim 2, wherein the swirl chamber tapers towards the emulsion outlet passage and the emulsion outlet passage is formed with a stepped enlargement at the outlet end of the swirl chamber.

4. An oil-water emulsion formation apparatus according to claim 2, wherein said injection valve is designed as a poppet valve.

5. An oil-water emulsion formation apparatus according to claim 3, wherein said injection valve is designed as a poppet valve.

6. A method of forming an water-in-oil emulsion at a Diesel engine, comprising:

injecting water in a predeterminedly dosed quantity into Diesel oil contained in swirl chamber disposed between a fuel injection pump and a fuel injection nozzle of the Diesel engine, to form an oil-water-mixture, the injection of water being carried out between two successive high pressure oil supply intervals and while the oil is at a middle or reduced pressure compared with said high pressure; and rotating the oil-water-mixture in the swirl chamber and holding the oil-water-mixture in rotation during the injection period of the fuel injection nozzle by tangentially introducing Diesel oil fed from the fuel injection pump under higher pressure into the swirl chamber, while supplying the rotating oil-water-mixture to the fuel injection nozzle.

\* \* \* \* \*